(12) United States Patent
Choi et al.

(10) Patent No.: US 11,165,844 B2
(45) Date of Patent: Nov. 2, 2021

(54) METHOD AND APPARATUS FOR PROVIDING DATA TO STREAMING APPLICATION IN ADAPTIVE STREAMING SERVICE

(71) Applicant: Samsung Electronics Co., Ltd, Suwon-si (KR)

(72) Inventors: Daekyu Choi, Suwon-si (KR); Dojun Byun, Seoul (KR); Sinseok Seo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/335,209

(22) PCT Filed: Sep. 20, 2017

(86) PCT No.: PCT/KR2017/010316
§ 371 (c)(1),
(2) Date: Mar. 20, 2019

(87) PCT Pub. No.: WO2018/056692
PCT Pub. Date: Mar. 29, 2018

(65) Prior Publication Data
US 2019/0289054 A1    Sep. 19, 2019

(30) Foreign Application Priority Data
Sep. 20, 2016 (KR) .................. 10-2016-0119794

(51) Int. Cl.
*H04L 29/06* (2006.01)
*H04N 21/845* (2011.01)
(Continued)

(52) U.S. Cl.
CPC ........ *H04L 65/608* (2013.01); *H04L 65/4084* (2013.01); *H04L 65/607* (2013.01);
(Continued)

(58) Field of Classification Search
CPC . H04L 65/4084; H04L 65/607; H04L 65/608; H04L 43/0864; H04L 12/1863;
(Continued)

(56) References Cited

U.S. PATENT DOCUMENTS 6,434,606 B1 * 8/2002 Borella ................. H04J 3/0632
709/214
6,697,870 B1 * 2/2004 Cafarelli, III ........... H04L 43/18
709/224
(Continued)

FOREIGN PATENT DOCUMENTS

| KR | 10-0665032 B1 | 1/2007 |
| KR | 10-2014-0003517 A | 1/2014 |
| KR | 10-2015-0107837 A | 9/2015 |

OTHER PUBLICATIONS

International Search Report dated Jan. 3, 2018 in connection with International Patent Application No. PCT/KR2017/010316, 2 pages.
(Continued)

*Primary Examiner* — Greg C Bengzon

(57) ABSTRACT

According to one embodiment of the present disclosure, a method for providing data to a streaming application by an electronic device in an adaptive streaming service comprises the operations of: determining a data provision time interval, that is, the time interval during which each of multiple pieces of data constituting a streaming content is provided to a streaming application through a proxy module; downloading first data, which is a part of the streaming content, from an external apparatus and storing the same; and when the streaming application requests the first data, providing the stored first data to the streaming application through the proxy module on the basis of the determined data provision time interval.

12 Claims, 9 Drawing Sheets

(51) Int. Cl.
  *H04N 21/433*   (2011.01)
  *H04N 21/438*   (2011.01)
(52) U.S. Cl.
  CPC ..... *H04N 21/4331* (2013.01); *H04N 21/4384* (2013.01); *H04N 21/8456* (2013.01)
(58) Field of Classification Search
  CPC . H04L 43/0876; H04L 43/0894; H04L 43/16; H04L 47/15; H04L 47/17; H04L 47/18; H04L 47/22; H04L 47/283; H04L 65/4076; H04L 65/60; H04L 65/601; H04L 65/602; H04L 65/605; H04L 67/10; H04L 67/1097; H04L 67/2814; H04L 67/2842; H04L 67/42; H04L 69/16; H04L 65/80; H04L 47/10; H04L 47/2416; H04L 29/06027; H04L 47/30; H04L 47/56; H04L 65/604; H04L 1/00; H04L 1/0002; H04L 1/0009; H04L 1/0018; H04L 1/1835; H04L 1/1838; H04L 1/1848; H04L 1/1854; H04L 1/205; H04L 29/06; H04L 29/0602; H04L 43/087; H04L 47/14; H04L 47/19; H04L 47/263; H04L 47/365; H04L 47/50; H04N 21/4331; H04N 21/4384; H04N 21/262; H04N 21/41407; H04N 21/4355; H04N 21/44209; H04N 21/6373; H04N 21/643; H04N 21/64322; H04N 21/64769; H04N 5/91; H04N 19/115; H04N 19/156; H04N 19/164; H04N 19/187; H04N 19/30; H04N 19/70; H04N 21/23439; H04N 21/23805; H04N 21/2401; H04N 21/26258; H04N 21/6125; H04N 21/6377; H04N 21/6379; H04N 21/6437; H04N 21/64753; H04N 21/658; H04N 21/6587; H04N 21/8456; H04N 7/17309; G06F 12/02; G06F 8/355; G06F 9/544; H04W 4/18
  See application file for complete search history.

(56) References Cited

U.S. PATENT DOCUMENTS

| | | | | |
|---|---|---|---|---|
| 7,505,912 | B2* | 3/2009 | Okuda | G10L 21/04 704/500 |
| 8,279,884 | B1* | 10/2012 | Narasimha | H04L 47/22 370/412 |
| 8,621,622 | B2* | 12/2013 | Norton | H04L 65/605 726/22 |
| 8,775,655 | B2* | 7/2014 | Zhang | H04N 7/17318 709/231 |
| 9,137,201 | B2* | 9/2015 | Sanders | H04J 3/1629 |
| 9,204,203 | B2* | 12/2015 | Brockmann | H04N 19/164 |
| 9,479,807 | B1* | 10/2016 | Bugajski | H04N 21/2402 |
| 9,779,362 | B1* | 10/2017 | Gold | G06F 16/783 |
| 9,948,539 | B2* | 4/2018 | Besehanic | H04L 43/106 |
| 10,218,589 | B1* | 2/2019 | Matthews | H04L 43/0876 |
| 10,305,955 | B1* | 5/2019 | Li | H04L 65/602 |
| 2003/0005074 | A1* | 1/2003 | Herz | H04L 29/06 709/216 |
| 2003/0163649 | A1* | 8/2003 | Kapur | G06F 12/0813 711/146 |
| 2003/0198184 | A1* | 10/2003 | Huang | H04L 29/06 370/231 |
| 2004/0057446 | A1* | 3/2004 | Varsa | H04L 29/06027 370/412 |
| 2004/0193762 | A1* | 9/2004 | Leon | H04L 29/06027 710/52 |
| 2004/0267956 | A1* | 12/2004 | Leon | H04L 12/5602 709/231 |
| 2006/0112168 | A1* | 5/2006 | Albers | H04L 47/263 709/213 |
| 2008/0052408 | A1* | 2/2008 | Saito | H04N 5/783 709/239 |
| 2008/0095198 | A1* | 4/2008 | Wager | H04L 47/56 370/519 |
| 2008/0151881 | A1* | 6/2008 | Liu | H04L 1/0002 370/389 |
| 2008/0181221 | A1* | 7/2008 | Kampmann | H04L 29/06027 370/389 |
| 2008/0205291 | A1* | 8/2008 | Li | H04L 47/722 370/254 |
| 2008/0256272 | A1* | 10/2008 | Kampmann | H04L 29/06027 710/57 |
| 2008/0267213 | A1* | 10/2008 | Deshpande | H04L 47/10 370/468 |
| 2009/0287841 | A1* | 11/2009 | Chapweske | H04L 65/4084 709/231 |
| 2009/0292819 | A1* | 11/2009 | Kandekar | H04N 7/17318 709/231 |
| 2010/0005501 | A1* | 1/2010 | Stokking | G10H 1/365 725/115 |
| 2010/0284275 | A1* | 11/2010 | Martinez | H04L 65/602 370/231 |
| 2010/0287274 | A1* | 11/2010 | Martinez | H04L 65/602 709/224 |
| 2010/0287296 | A1* | 11/2010 | Riggert | H04L 65/608 709/231 |
| 2010/0296525 | A1* | 11/2010 | Mahkonen | H04L 47/10 370/516 |
| 2011/0167170 | A1* | 7/2011 | Kovvali | H04W 28/06 709/232 |
| 2011/0238789 | A1* | 9/2011 | Luby | H04L 65/601 709/219 |
| 2011/0264818 | A1* | 10/2011 | Riggert | H04L 47/18 709/231 |
| 2011/0273985 | A1* | 11/2011 | Siemens | H04L 47/10 370/235 |
| 2011/0283009 | A1* | 11/2011 | Martinez | H04N 21/6125 709/231 |
| 2012/0102184 | A1* | 4/2012 | Candelore | H04N 21/4728 709/224 |
| 2012/0110167 | A1* | 5/2012 | Joch | H04N 21/2401 709/224 |
| 2012/0117225 | A1* | 5/2012 | Kordasiewicz | H04L 65/1083 709/224 |
| 2012/0151009 | A1* | 6/2012 | Bouazizi | H04L 41/5067 709/219 |
| 2012/0177101 | A1* | 7/2012 | van der Schaar | H04N 19/30 375/240.01 |
| 2012/0215997 | A1* | 8/2012 | Stanfill | G06F 12/02 711/158 |
| 2012/0218887 | A1* | 8/2012 | Khilnani | H04L 43/0876 370/230 |
| 2012/0278500 | A1* | 11/2012 | Ganjam | H04L 65/607 709/231 |
| 2012/0284370 | A1* | 11/2012 | Hierro | H04L 43/0894 709/219 |
| 2012/0311126 | A1* | 12/2012 | Jadallah | H04L 41/5067 709/224 |
| 2013/0041998 | A1* | 2/2013 | Kordasiewicz | H04H 60/33 709/224 |
| 2013/0044597 | A1* | 2/2013 | Rugel | H04L 47/10 370/230.1 |
| 2013/0083654 | A1* | 4/2013 | Lee | H04L 47/283 370/230 |
| 2013/0086279 | A1* | 4/2013 | Archer | H04L 69/14 709/233 |
| 2013/0159498 | A1* | 6/2013 | Funge | H04L 65/80 709/224 |
| 2013/0282871 | A1* | 10/2013 | Jung | H04L 65/60 709/219 |
| 2013/0282918 | A1* | 10/2013 | De Vleeschauwer | H04N 21/8455 709/231 |

(56) References Cited

U.S. PATENT DOCUMENTS

| | | | |
|---|---|---|---|
| 2013/0286868 A1* | 10/2013 | Oyman | H04W 52/243 370/252 |
| 2013/0286879 A1* | 10/2013 | ElArabawy | H04N 21/26208 370/252 |
| 2013/0290492 A1* | 10/2013 | ElArabawy | H04L 65/80 709/219 |
| 2013/0298170 A1* | 11/2013 | ElArabawy | H04W 28/0231 725/62 |
| 2013/0336638 A1* | 12/2013 | Fork | H04N 21/2387 386/278 |
| 2014/0082146 A1* | 3/2014 | Bao | H04N 21/23406 709/219 |
| 2014/0089993 A1* | 3/2014 | Huysegems | H04N 21/44209 725/86 |
| 2014/0115114 A1* | 4/2014 | Garmark | H04L 65/60 709/219 |
| 2014/0137158 A1* | 5/2014 | Kannan | H04N 21/435 725/54 |
| 2014/0139687 A1* | 5/2014 | Adams | H04N 17/004 348/192 |
| 2014/0181266 A1* | 6/2014 | Joch | H04L 65/605 709/219 |
| 2014/0199044 A1* | 7/2014 | Gupta | H04L 67/10 386/239 |
| 2014/0207845 A1* | 7/2014 | Han | H04L 47/283 709/203 |
| 2014/0207907 A1* | 7/2014 | Wang | H04L 65/602 709/217 |
| 2014/0244727 A1* | 8/2014 | Kang | H04L 65/4084 709/203 |
| 2014/0280760 A1* | 9/2014 | Hurst | H04L 65/60 709/219 |
| 2014/0282769 A1* | 9/2014 | Salem | H04N 21/26216 725/94 |
| 2014/0282792 A1* | 9/2014 | Bao | H04N 21/44004 725/116 |
| 2014/0304320 A1* | 10/2014 | Taneja | H04L 69/16 709/203 |
| 2014/0341026 A1* | 11/2014 | Gahm | H04L 47/76 370/232 |
| 2014/0344879 A1* | 11/2014 | Phillips | H04N 21/23805 725/115 |
| 2014/0366070 A1* | 12/2014 | Lee | H04N 21/2662 725/62 |
| 2014/0372591 A1* | 12/2014 | Payette | H04L 67/141 709/223 |
| 2015/0026309 A1* | 1/2015 | Radcliffe | H04L 65/602 709/219 |
| 2015/0052246 A1* | 2/2015 | Kordasiewicz | H04N 21/64723 709/224 |
| 2015/0089026 A1* | 3/2015 | Payette | H04L 67/141 709/219 |
| 2015/0089073 A1* | 3/2015 | Phillips | H04L 65/602 709/231 |
| 2015/0095509 A1* | 4/2015 | Huang | H04L 65/604 709/231 |
| 2015/0110135 A1* | 4/2015 | Vafin | H04L 43/087 370/517 |
| 2015/0163273 A1* | 6/2015 | Radcliffe | H04L 65/602 709/231 |
| 2015/0172340 A1* | 6/2015 | Lohmar | H04N 21/2401 709/219 |
| 2015/0172357 A1* | 6/2015 | Olrog | H04L 67/02 709/203 |
| 2015/0215359 A1* | 7/2015 | Bao | H04L 65/605 709/219 |
| 2015/0237105 A1* | 8/2015 | Satoda | H04L 65/607 709/231 |
| 2015/0281770 A1* | 10/2015 | Lim | H04N 21/44004 725/110 |
| 2015/0296047 A1* | 10/2015 | Ghazisaidi | H04L 65/80 709/219 |
| 2015/0326901 A1* | 11/2015 | Tiraspolsky | H04N 21/472 725/31 |
| 2015/0341812 A1* | 11/2015 | Dion | H04W 24/08 370/252 |
| 2015/0350099 A1* | 12/2015 | Sun | H04L 47/283 370/412 |
| 2015/0350369 A1* | 12/2015 | Ilsar | H04L 67/2847 709/219 |
| 2015/0373075 A1* | 12/2015 | Perlman | H04L 65/608 709/217 |
| 2016/0050130 A1* | 2/2016 | Ljung | H04N 21/47214 709/224 |
| 2016/0050246 A1* | 2/2016 | Liao | H04L 65/80 709/219 |
| 2016/0088322 A1* | 3/2016 | Horev | H04N 21/8456 725/14 |
| 2016/0094608 A1* | 3/2016 | Sundararajan | H04L 47/27 709/219 |
| 2016/0164788 A1* | 6/2016 | Goel | H04L 43/0876 709/228 |
| 2016/0191258 A1* | 6/2016 | Oyman | H04L 12/189 370/312 |
| 2016/0198199 A1* | 7/2016 | Bottari | H04N 21/44004 725/96 |
| 2016/0248835 A1* | 8/2016 | Petrangeli | H04L 65/608 |
| 2016/0315841 A1* | 10/2016 | Kang | H04L 43/0864 |
| 2016/0337419 A1* | 11/2016 | Persson | H04L 43/0882 |
| 2016/0373546 A1* | 12/2016 | Lotfallah | H04L 67/02 |
| 2017/0026713 A1* | 1/2017 | Yin | H04N 21/23439 |
| 2017/0054776 A1* | 2/2017 | Dao | H04L 65/1089 |
| 2017/0093648 A1* | 3/2017 | ElArabawy | H04L 41/5067 |
| 2017/0118631 A1* | 4/2017 | Zou | H04W 8/245 |
| 2017/0149624 A1* | 5/2017 | Chitti | H04L 41/50 |
| 2017/0171082 A1* | 6/2017 | Jiang | H04L 67/325 |
| 2017/0207997 A1* | 7/2017 | Martin | H04L 45/02 |
| 2017/0257425 A1* | 9/2017 | Narsude | G06F 16/258 |
| 2017/0264665 A1* | 9/2017 | Stevens | H04L 65/608 |
| 2017/0295454 A1* | 10/2017 | Albrecht | H04L 65/605 |
| 2017/0324795 A1* | 11/2017 | Ashida | G09C 1/00 |
| 2017/0331665 A1* | 11/2017 | Porfiri | H04L 69/16 |
| 2017/0346745 A1* | 11/2017 | Lim | H04N 21/2401 |
| 2018/0007106 A1* | 1/2018 | Racz | H04L 65/80 |
| 2018/0041788 A1* | 2/2018 | Wang | H04N 21/2343 |
| 2018/0139261 A1* | 5/2018 | Sintorn | H04L 65/602 |
| 2019/0200070 A1* | 6/2019 | Raikar | H04N 21/4263 |
| 2019/0281364 A1* | 9/2019 | Szabo | H04L 65/607 |
| 2020/0021633 A1* | 1/2020 | Sengoku | H04L 65/607 |
| 2020/0059694 A1* | 2/2020 | Ju | H04N 21/440263 |

OTHER PUBLICATIONS

Written Opinion of the International Searching Authority dated Jan. 3, 2018 in connection with International Patent Application No. PCT/KR2017/010316, 7 pages.

* cited by examiner

FIG. 3A

```
//GET DELAY PER BITRATE
private int getDelay(int index){
    int delay =0;
    //10Mbps
    int proxyBW = 15000000;
    //ts Duration : 4s
    double tsDuration = 4.0;
    //base bitrate : 500Kbps
    int baseBitrate = 500000;
    //marginal delay : 100ms
    int marDelay = 50 * index;
    //standard time : 1s
    int standard = 1;

double dDelay = 0;

dDelay = standard - ( ( (int)getBitrate() * tsDuration) / proxyBW );

delay = (int)(dDelay * 1000) - marDelay;

DLog.d(mTag, "MPDelay: "
        + " Resolution : " + (int)getBitrate()
        + " Resolution_idx : " + index
        + " Calculated Delay : " + delay
        + " Double Delay : " + dDelay if( delay < 0 )
        return 100;
    else
        return delay;
}
```

301 brackets the two lines:
`dDelay = standard - ( ( (int)getBitrate() * tsDuration) / proxyBW );`
`delay = (int)(dDelay * 1000) - marDelay;`

FIG. 3B

| |
|---|
| //PRACTICAL IMPLEMENTATION |
| //getDelay |
| constTime = getDelay( mResolution ); |
| |
| //getCurrentTime |
| curTime = Calendar.getInstance(); |
| |
| timeDiff = curTime.getTimeInMillis() − preTime.getTimeInMillis(); — 302 |
| |
| //Sleep 2 seconds |
| |
| if( timeDiff < constTime ){ |
|     DLog.d(mTag, "MPDelay: It is sleeping, constime: " |
|     + constTime + " timeDiff: " + timeDiff |
|     + " Delay: " +(constTime − timeDiff) + " to keep constant rates"); |
| |
|     try { |
|         //ACTUAL DELAY ADDITION |
|         Thread.sleep( constTime − timeDiff ); — 304 |
|     } catch (InterruptedException e) { |
|     // TODO Auto-generated catch block |
|         e.printStackTrace(); |
|     } |
|     } |

(303 brackets the if-block)

METHOD AND APPARATUS FOR PROVIDING DATA TO STREAMING APPLICATION IN ADAPTIVE STREAMING SERVICE

CROSS-REFERENCE TO RELATED APPLICATIONS

This application is a 371 of International Application No. PCT/KR2017/010316 filed Sep. 20, 2017, which claims priority to Korean Patent Application No. 10-2016-0119794 filed Sep. 20, 2016, the disclosures of which are herein incorporated by reference in their entirety.

BACKGROUND

1. Field

The present disclosure relates to adaptive streaming service technology and, more particularly, to a method and apparatus for providing data constituting streaming content to a streaming application through a proxy module in an adaptive streaming service.

2. Description of Related Art

A streaming service may be used for a video-on-demand (VOD) service or an audio-on-demand (AOD) service. This streaming service adapts a technique of performing real-time playback of a video or audio file while a terminal downloads the file from a server, rather than performing playback after downloading the entire file. Thus, even before the entire file is received, the terminal starts to represent data through a browser or plug-in of the terminal. Therefore, for a user, there is an advantage that the playback starts early and the capacity of a hard disk drive is hardly affected. Also, for an operator, there is an advantage that the charge can be easily imposed and the illegal copying of content can be minimized.

The streaming service has been activated with the introduction of wired/wireless broadband communication that provides a fast transmission speed, such as an asymmetric digital subscriber line (ADSL), a very high-data rate digital subscriber line (VDSL), a power line communication (PLC), an optical communication, and 2.5G or 3G mobile communication. The reason is that, in order to enable the streaming service, a server for transmitting data and an electronic device for receiving data should continuously transmit and receive a large amount of multimedia data and also should be able to provide the data to a streaming application that reproduces the data as video or audio.

However, as multimedia data including video or audio gradually has high resolution and high sound quality, the data amount is also gradually increasing. In addition, due to the characteristics of Internet communication lines, the transmission speed is becoming variable depending on usage environments such as a peak time zone crowded with many users. As such, no guarantee of a transmission speed in some environments often causes a poor playback of video and audio due to the irregularity of a transmission speed of data. Assuming, for example, that there is content to be reproduced only when data of about 16 kilobits (Kb) per second is input, a discontinuity phenomenon occurs during the playback when the transmission speed provided by the communication line varies between 15 kbps and 18 kbps. A buffering technique is a method to reduce this discontinuity. For example, if playback data of 10 seconds is stored in advance in a buffer at the time of starting the streaming service and then the playback is started, the buffered data of 10 seconds can significantly reduce a discontinuity phenomenon even though input data becomes smaller than current playback data at a certain time point.

As described above, because a wireless network is inherently in an unstable state, the buffering technique of storing certain data in advance is very important when an electronic device provides a streaming service. Accordingly, in order to adaptively provide the streaming service based on the state of the wireless network, it is required to effectively support the buffering technique and thereby provide data to a streaming application.

When data is provided to a streaming application using a buffering technique, the streaming application may determine a network state between an electronic device and an external device transmitting streaming content, based on a provision speed of buffered data instead of an actual network state.

In case of determining the network state on the basis of the provision speed of the buffered data, the streaming application may fail to accurately determine the actual network state. Thus, the streaming application may unnecessarily request data, thereby inefficiently using network resources.

Accordingly, it is an object of the present disclosure to enable a streaming application to reliably request data in an adaptive streaming service and enable an electronic device to continuously provide high-resolution streaming content in response to the request, thereby improving the quality of experience (QoE) of a user.

In addition, the technical problem to be solved in the present disclosure is not limited to the above, and any other technical problem which is not mentioned can be clearly understood from the following description by a person having ordinary knowledge in the technical field to which the present disclosure belongs.

SUMMARY

According to an embodiment of the present invention, a method for providing data to a streaming application in an adaptive streaming service comprises operations of determining a data provision time interval which is an interval of time at which each of a plurality of data constituting streaming content is provided to a streaming application through a proxy module; downloading and storing first data, which is a fragment of the streaming content, from an external device; and when the streaming application requests the first data, providing the stored first data to the streaming application through the proxy module, based on the determined data provision time interval.

According to another embodiment of the present invention, an electronic device for providing data to a streaming application in an adaptive streaming service comprises a communication unit configured to download, from an external device, first data which is a fragment of streaming content; a storage unit configured to store the downloaded first data; and a controller configured to determine a data provision time interval which is an interval of time at which each of a plurality of data constituting streaming content is provided to a streaming application through a proxy module, and configured to, when the streaming application requests the first data, provide the stored first data to the streaming application through the proxy module, based on the determined data provision time interval.

According to still another embodiment of the present invention, a computer-readable non-transitory recording medium stores a program that enables an electronic device to perform, in an adaptive streaming service, operations of determining a data provision time interval which is an interval of time at which each of a plurality of data constituting streaming content is provided to a streaming application through a proxy module; downloading and storing first data, which is a fragment of the streaming content, from an external device; and when the streaming application requests the first data, providing the stored first data to the streaming application through the proxy module, based on the determined data provision time interval.

According to an embodiment of the present disclosure, in the adaptive streaming service, the electronic device provides the streaming application with the data that constitutes the streaming content, based on the data provision time interval calculated in advance, and thereby the streaming application can determine the network state continuously and reliably.

Accordingly, the data request rate of the streaming application decreases, the resources of the electronic device can be efficiently used, and the average resolution of the data can be increased as compared with the conventional method. That is, the quality of experience (QoE) of the user receiving the streaming content can be greatly improved.

In addition, effects obtained or predicted by embodiments of the present disclosure will be explicitly or implicitly disclosed in the detailed description of the embodiments. For example, various effects to be predicted according to embodiments of the present disclosure will be disclosed in the following detailed description.

BRIEF DESCRIPTION OF THE DRAWINGS

FIGS. 3A and 3B illustrate examples of syntaxes for providing data to a streaming application according to an embodiment of the present disclosure.

Throughout the drawings, it should be noted that like reference numerals are used to illustrate the same or similar elements, features, and structures.

DETAILED DESCRIPTION

Figure 1:
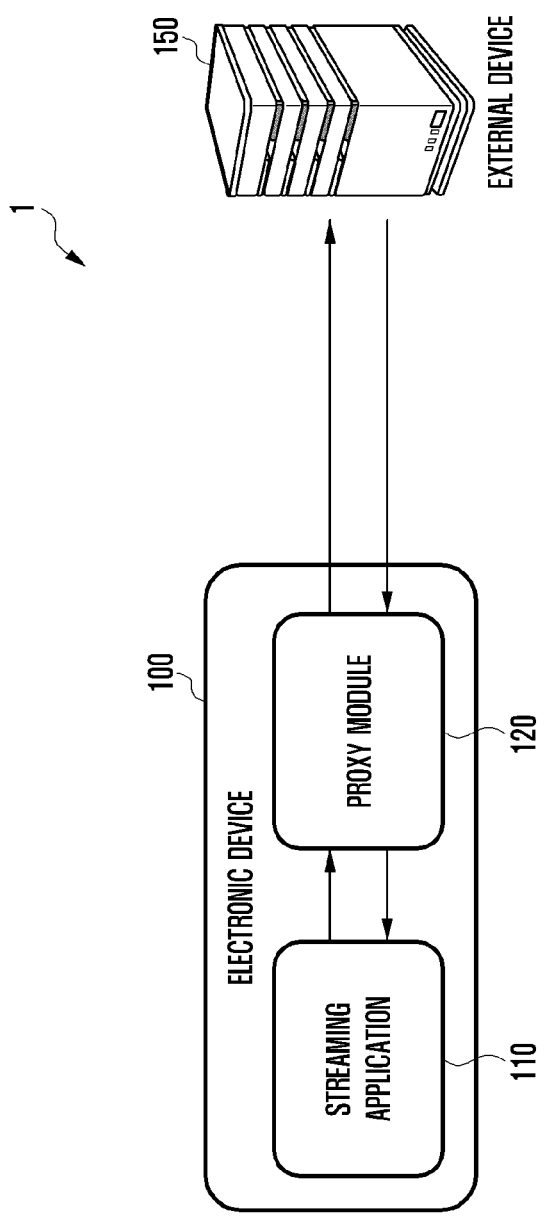
FIG. 1 is a diagram illustrating an example of a streaming system for providing a streaming service according to an embodiment of the present disclosure.

Now, embodiments of the present disclosure will be described in detail with reference to the accompanying drawings. In the following description of this disclosure, detailed description of known functions and configurations will be omitted when it may make the subject matter of the present disclosure rather unclear. The terms used herein are defined in consideration of functions in one embodiment of the present disclosure, and may be changed according to the intention of the user, the operator, or the like. Therefore, the definition should be based on the contents throughout this specification.

In addition, singular expressions such as "a/an" and "the" may include plural expressions unless the context clearly dictates otherwise. For example, "a component surface" includes one or more component surfaces.

In addition, expressions including ordinal numbers such as "first" and "second" may indicate various elements. The above expressions do not limit the sequence or importance of the elements, and are used merely for the purpose to distinguish one element from the others. For example, without departing from the scope of the present disclosure, a first element may be referred to as a second element, and similarly a second element may be also referred to as a first element. The term "and/or" includes a combination of a plurality of specified items or any of a plurality of specified items.

Terms used herein may be merely to describe a certain embodiment, and may not be intended to limit the disclosure. The singular expressions may include plural expressions unless the context clearly dictates otherwise. In this disclosure, the terms such as "comprise", "include", and "have" denote the presence of stated elements, components, operations, functions, features, and the like, but do not exclude the presence of or a possibility of addition of one or more other elements, components, operations, functions, features, and the like.

In addition, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

When a first element is referred to as being "connected" or "coupled" (operatively or communicatively) to a second element, it may mean that the first element is connected or coupled directly to the second element or indirectly through any other element (e.g., a third element).

Terms used herein, including technical or scientific terms, may have the same meaning as commonly understood by those skilled in the art. Some terms defined in a normal dictionary may be interpreted as having the same or similar meaning as the contextual meanings in the related art. Certain terms are not to be construed as an ideal or overly formal detect unless expressly defined to the contrary herein. In some cases, the terms defined herein cannot be construed to exclude embodiments of the present disclosure.

An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a portable medical device, a digital camera, or a wearable device. According to various embodiments, the wearable device may include at least one of an accessory-type device (e.g., a watch, a ring, a bracelet, an anklet, a necklace, glasses, a contact lens, or a head-mounted device (HMD), a fabric- or cloth-type device (e.g., electronic cloth), a body-attached type device (e.g., a skin pad or tattoo), or a body-implemented type circuit. In some embodiments, the electronic device may be home appliance. For example, the home appliance may include at least one of a TV, a digital video disk (DVD) player, audio equipment, a refrigerator, an air conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic picture frame.

In another embodiment, the electronic device may include at least one of a medical device (e.g., portable medical measuring equipment (e.g., a blood sugar meter, a heart rate meter, a blood pressure meter, a clinical thermometer, etc.), a magnetic resonance angiography (MRA), a magnetic resonance imaging (MRI), a computed tomography (CT), an ultrasonography, etc.), a navigation device, a global navigation satellite system (GNSS), an event data recorder (EDR), a flight data recorder (FDR), a car infotainment device, electronic equipment for ship (e.g., a marine navigation system, a gyrocompass, etc.), avionics, security equipment, a car head unit, an industrial or home robot, an automated teller machine (ATM), a point of sales (POS), or a device for internet of things (IoT) (e.g., a bulb, a sensor, a sprinkler, a fire alarm, a thermostat, a streetlight, a toaster, athletic equipment, a hot-water tank, a heater, a boiler, etc.). In a certain embodiment, the electronic device may be include at least one of furniture, a part of a building/construction or car, an electronic board, an electronic signature receiving device, a projector, or various measuring instruments (e.g., a water meter, an electric meter, a gas meter, a wave meter, etc.). In various embodiments, the electronic device may be one of the above-mentioned devices or a combination thereof. The electronic device according to a certain embodiment may be a flexible electronic device. The electronic device according to embodiments disclosed herein is not limited to the above-mentioned devices and may include new electronic devices to be launched with the growth of technology. Hereinafter, an electronic device according to various embodiments will be described. In this disclosure, the term user may refer to a person or a device (e.g., an artificial intelligence device) using the electronic device.

FIG. 1 is a diagram illustrating an example of a streaming system for providing a streaming service according to an embodiment of the present disclosure.

Referring to FIG. 1, the streaming system 1 may include an electronic device 100 for driving a streaming application and an external device 150 for transmitting streaming content to the electronic device 100. The external device 150 may include a streaming server for storing streaming content, a relay server for delivering streaming content, or the like.

The external device 150 may be one of various kinds of the above-described electronic devices, or may be a cloud server composed of a plurality of servers. Because the configuration of the external device 150 is well known, a further explanation will be omitted herein.

In addition, the electronic device 100 and the external device 150 may be connected through a certain network (not shown) or directly. Normally, the electronic device 100 and the external device 150 are connected through the network. Also, when the electronic device 100 is a smart phone, a tablet computer, a smart watch, or the like that uses a wireless communication service, at least a part of the network connecting the electronic device 100 and the external device 150 may include a wireless network. On the other hand, in case of a personal computer or the like that mainly uses a wired network, the network connecting the electronic device 100 and the external device 150 may be entirely composed of a wired network. However, even in case of the personal computer, at least a part of the network connecting the electronic device 100 and the external device 150 may be composed of a wireless network. The electronic device 100 may drive a streaming application 110. The streaming application 110 is a specific application for providing a streaming service such as a VOD service or an AOD service to a user. For example, the streaming application 110 may be Netflix, Hulu, Amazon player, or the like.

Streaming content that is the target of a streaming service may be, for example, video content, audio content, image content, text content, or the like.

The user may request the streaming service by driving the streaming application 110 and selecting the streaming content through a user interface. Then, the streaming application 110 may send a request for data constituting the selected streaming content to the external device 150 through a proxy module 120. In this disclosure, the term data may be a fragment of the streaming content.

At this time, using, for example, a hypertext transfer protocol (HTTP), the electronic device 100 may request data from the external device 150. As a response to the data request, the electronic device 100 may receive data from the external device 150 using HTTP. Here, HTTP used between the electronic device 100 and the external device 150 is an example of a protocol. In embodiments of this disclosure, any other protocol may be applied according to the type of application and the type of data to be transmitted and received.

In order to improve the quality of experience (QoE) of the user, the electronic device 100 may download in advance data by using the proxy module 120, store the downloaded data in a buffer, and provide the stored data to the streaming application in response to a data request. That is, the electronic device 100 may provide data to the streaming application, based on an adaptive streaming service using the proxy module 120.

According to the adaptive streaming service, it is possible to efficiently receive data through the network without changing the configuration and operation of the streaming application and of the external device (e.g., a streaming server) that provides streaming content.

That is, in case of typical scheme, it is necessary to change the configuration and operation of the streaming application and/or of the streaming server in order to improve the performance of receiving data. However, a currently commercialized system disallows changing the configuration and operation of the streaming application and of the streaming server, so that a method of performing effective data buffering cannot be applied.

The adaptive streaming service proposes a method for performing data buffering in the electronic device without changing the configuration and operation of the streaming application and of the streaming server. Therefore, the adaptive streaming service has an advantage of being able to use the configuration and operation of the streaming application and of the streaming server used in the commercialized system as they are.

That is, in the adaptive streaming service, the user's QoE can be greatly improved. For example, an initial buffering time (i.e., time until the playback of streaming data selected by the user is started) is shortened, or a resolution is increased through the provision of a high video quality, thereby improving the user's QoE.

In the adaptive streaming service, the electronic device 100 may pre-fetch data to be transmitted to the streaming application. When the electronic device 100 pre-fetches data, the electronic device 100 may determine parameters for data buffering and, based on the determined parameters, request data from the external device 150. For example, the electronic device 100 may measure the throughput of one session and an available bandwidth and, based on the measured throughput and available bandwidth, determine the number of multi-sessions. In addition, based on a cache hit radio of the streaming application 110, the electronic device 100 may predetermine a buffer size for storing data. Based on such parameters determined for data buffering, the electronic device 100 may send a request for data to the external device 150 via the proxy module 120.

For example, when the streaming application 110 requests first data (1.ts) which is a fragment of streaming content, the proxy module 120 may download the first data (1.ts) via multi-session and then provide the first data to the streaming application while pre-fetching second data (2.ts) which is the next fragment of the streaming content. In this case, when the streaming application 110 requests the second data (2.ts), the proxy module 120 may immediately transmit the pre-fetched second data (2.ts) to the streaming application 110.

In this case, the streaming application 110 may determine a network state between the electronic device 100 and the external device 150, based on a provision speed of data provided from the proxy module 120.

For example, when data is requested from the streaming application 110, the proxy module 120 operates differently depending on whether pre-fetched data exists or not. If the pre-fetched data exists, the proxy module 120 may immediately provide the pre-fetched data to the streamed application 110 in response to the request of the streaming application 110. In this case, the streaming application 110 may determine that the current network state is good.

On the other hand, if there is no pre-fetched data, the proxy module 120 cannot immediately provide data in response to the request of the streaming application 110. That is, the proxy module 120 may request and receive data from the external device 150 and then provide it to the streaming application 110. In this case, because a considerable time delay occurs, the streaming application 110 may determine that the current network state is bad.

That is, in the adaptive streaming service, the streaming application 110 determines a network state, based on a provision rate of data provided from the proxy module 120, rather than determine an actual network state between the electronic device 100 and the external device 150. As such, because the streaming application 110 does not receive data directly from the external device 150 and indirectly receives data through the proxy module 120, the streaming application 110 may erroneously determine the network state. If the streaming application 110 erroneously determines the network state, the fluctuation of the data request of the streaming application 110 may occur severely.

Specifically, when there is pre-fetched data, the streaming application 110 that receives data immediately upon request may determine that the network state is good. Therefore, the streaming application 110 may immediately request the next data. That is, a data request time interval of the streaming application 110 may be short.

On the other hand, when there is no pre-fetched data, the streaming application 110 cannot receive data immediately. In this case, the streaming application 110 may determine that the network state is bad, discard the previously provided data, and request low-resolution data again. Therefore, network resources are consumed, and the electronic device 100 may perform unnecessary processing. In a certain case, heating of the electronic device 100 may be caused.

In order to solve this problem, in the adaptive streaming service, the electronic device 100 may determine in advance a data provision time interval which is an interval of time at which each of a plurality of data constituting the streaming content is provided to the streaming application 110. In addition, when there is a data request from the streaming application 110, the electronic device 100 may delay pre-fetched data corresponding to the request for a given time, based on the predetermined data provision time interval, and transmit the delayed data to the streaming application 110.

In this case, the electronic device 100 may compare the data provision time interval with a time interval at which the streaming application 110 requests data, thereby adjust the delay time, and then transmit data corresponding to the request to the streaming application 110. This means that the electronic device 100 provides data to the streaming application 110 while applying an adaptive delay.

Hereinafter, in the adaptive streaming service, a scheme that the electronic device 100 provides data to the streaming application while applying an adaptive delay will be described in more detail.

Figure 2:
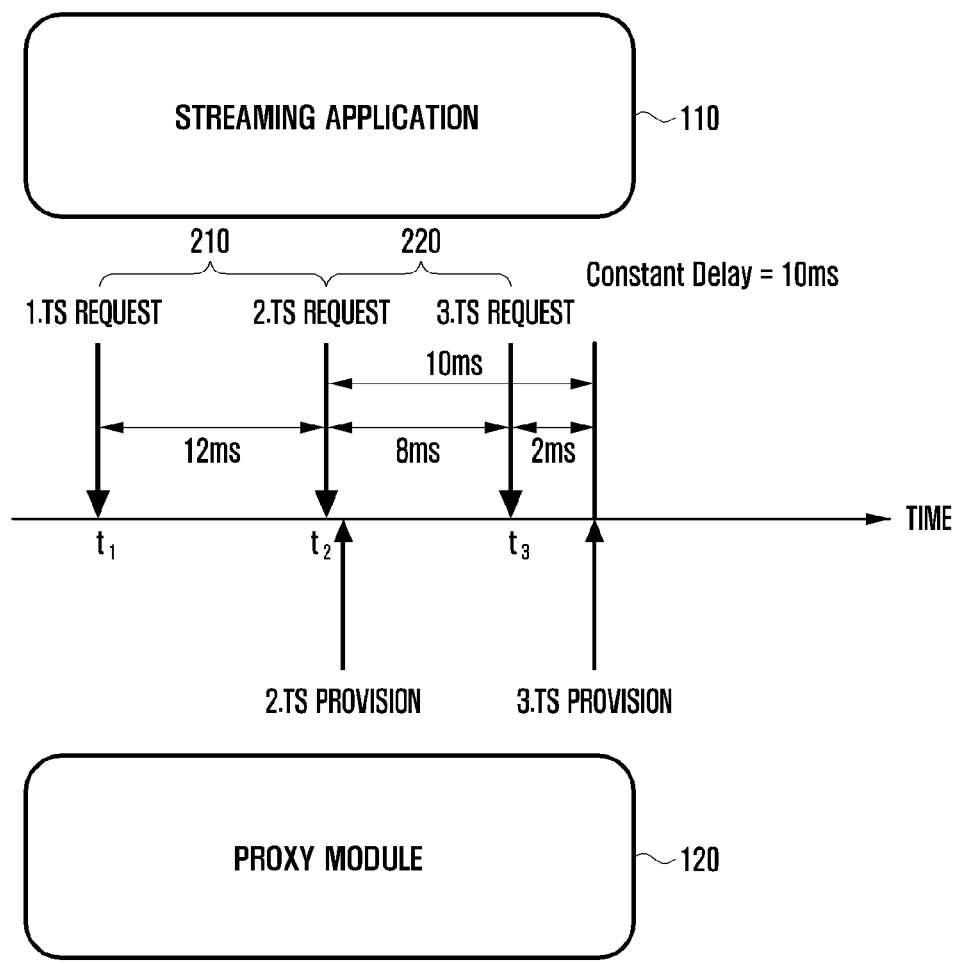
FIG. 2 is a diagram illustrating a process of providing data to a streaming application according to an embodiment of the present disclosure.

FIG. 2 is a diagram illustrating a process in which an electronic device provides streaming content in an adaptive streaming service according to an embodiment of the present disclosure.

Referring to FIG. 2, in the adaptive streaming service, the electronic device 100 may determine a data provision time interval which is an interval of time at which the proxy module 120 provides each of data constituting streaming content to the streaming application 110. In addition, there is a data request from the streaming application 110, the electronic device 100 may provide, based on the determined data provision time interval, data corresponding to the request to the streaming application 110 via the proxy module 120.

For example, the electronic device 100 may determine Constant Delay, which is the data provision time interval, according to Equation 1 below.

$$\text{Constant Delay} = \alpha - \frac{Bitrate * Duration}{proxyBW} + marginalDelay \quad \text{[Equation 1]}$$

In Equation 1, α may be an interval of a request time at which the streaming application 110 sends a request for data to the proxy module 120 in a situation where a network state is decided to be stable (i.e., in a situation where a data resolution is kept constant). In this case, α may be experimentally determined and be referred to as a standard time value in this disclosure.

In addition, proxyBW may be a data provision rate when the proxy module 120 provides data to the streaming application 110.

In addition, Bitrate is a bit rate (a transmission rate per time) of data requested to the proxy module 120 by the streaming application 110 and may be a resolution of data.

In addition, Duration may be a data playback time for which data provided to the streaming application 110 by request is actually played.

In addition, marginalDelay is a time for data processing at the electronic device 100 and may be a marginal time experimentally determined.

In this case, the data provision time interval may decrease as the bit rate of data requested to the proxy module 120 by the streaming application 110 increases.

In addition, the data provision time interval may increase as the provision rate of data provided to the streaming application 110 by the proxy module 120 increases.

In addition, the data provision time interval may decrease as the data playback time for which data provided to the streaming application 110 by the proxy module 120 is played increases.

The electronic device 100 may provide the pre-fetched data to the streaming application 110 through the proxy module 120, based on the data provision time interval and the data request time interval of the streaming application 110.

As indicated by reference numeral 210 in FIG. 2, the streaming application 110 may send a request for first data (1.ts) which is a fragment of streaming content to the proxy module 120 and then send a request for second data (2.ts) which is the next fragment of the streaming content to the proxy module 120.

The electronic device 100 may compare a data request time interval, which is a time interval between a request time (t1) for the first data and a request time (t2) for the second data, with the data provision time interval calculated in Equation 1.

If the data request time interval of the streaming application 110 is equal to or greater than the data provision time interval, the electronic device 100 may immediately provide the second data (2.ts) to the streaming application 110 through the proxy module 120. Here, the immediate provision is a process of being distinct from a process 220, and may mean providing the pre-fetched second data (2.ts) to the streaming application 110 via the proxy module 120 without any wait in response to the data request of the streaming application 110.

Specifically, when the data provision time interval (Constant Delay) is determined to be 10 ms, a time interval between the request time (t1) for the first data (1.ts) and the request time (t2) for the second data (2.ts) may be measured as 12 ms as indicated by reference numeral 210. In this case, the electronic device 100 determines that the data request time interval (12 ms) is greater than the data provision time interval (10 ms), and may immediately provide the second data (2.ts) to the streaming application 110 via the proxy module 120.

In another embodiment, as indicated by reference numeral 220, after sending a request for the second data (2.ts) which is a fragment of streaming content to the proxy module 120, the streaming application 110 may send a request for third data (3.ts) which is the next fragment of the streaming content to the proxy module 120.

The electronic device 100 may compare a data request time interval, which is a time interval between a request time (t2) for the second data (2.ts) and a request time (t3) for the third data (3.ts), with the data provision time interval calculated in Equation 1.

If the data request time interval of the streaming application 110 is smaller than the data provision time interval, the electronic device 100 may provide the third data (3.ts) to the streaming application 110 through the proxy module 120 after delay for a predetermined time (or after a wait for a predetermined time). Here, the predetermined time may be a difference in time between the data provision time interval and the data request time interval.

Specifically, when the data providing time interval (Constant Delay) is determined to be 10 ms, a time interval between the request time (t2) for the second data (2.ts) and the request time (t3) for the third data (3.ts) may be measured as 8 ms as indicated by reference numeral 220. In this case, the electronic device 100 determines that the data request time interval (8 ms) is smaller than the data provision time interval (10 ms), and may provide the third data (3.ts) to the streaming application 110 through the proxy module 120 after delay for 2 ms (=10 ms−8 ms) corresponding to a difference in time between both time intervals.

As such, in the adaptive streaming service, the electronic device 100 provides data to the streaming application 110 through the proxy module 120, based on an adaptive delay, so that the streaming application 110 can determine a network state reliably. Therefore, a certain situation in which the fluctuation of the data request of the streaming application 110 occurs severely can be suppressed.

The adaptive delay time may be varied in consideration of the bit rate of data. For example, the higher the bit rate of data is, the shorter the delay time is set to be. Also, the lower the bit rate of data is, the longer the delay time is set to be. Accordingly, in the adaptive streaming service, the streaming application 110 can receive data at a constant rate and determine a network state reliably. In addition, a situation of causing a severe fluctuation to the data request of the streaming application 110 can be prevented.

According to various embodiments, the number of data that the proxy module 120 performs pre-fetch may preferably be one or more.

If there is no data currently being downloaded from the external device by the electronic device 100 at the request of the streaming application 110, the electronic device 100 may perform the pre-fetch of data without limitation of the number. In one example, even after completing the pre-fetch of the first data (1.ts), the electronic device 100 may perform in advance the pre-fetch of the second data (2.ts).

In addition, in the adaptive streaming service, the electronic device 100 may provide data to the streaming application 110 by combining a scheme of providing a plurality of pre-fetched data with a scheme of providing data on the basis of the adaptive delay of this disclosure. For example, while continuously increasing the pre-fetched data, the electronic device 100 may apply the adaptive delay to some of the pre-fetched data in response to a request of the streaming application 110. In this case, as the number of pre-fetches increases, the data resolution provided to the streaming application 110 may be further improved.

FIGS. 3A and 3B illustrate examples of syntaxes for providing data to a streaming application in an adaptive streaming service according to an embodiment of the present disclosure.

In FIG. 3A, getDelay( ) which is a function for determining the data provision time interval may include syntax 301 including a dDelay variable and a delay variable for calculating a value of the data provision time interval.

Referring to the above-described Equation 1, a calculation result using a standard value as a standard time, a getBitrate( ) return value as a bit rate of data, a tsDuration value as a playback time of data, and a proxyBW value as a data provision rate may be input to the dDelay variable.

Next, a value excluding a marDelay value from the calculated dDelay value may be input to the delay variable.

In this case, when the getDelay( ) function is called, the delay value may be provided as the data provision time interval by a return value of the getDelay( ) function.

FIG. 3B shows an example of syntax for delaying a data provision time in the adaptive streaming service in consideration of the data provision time interval.

In syntax 302 of FIG. 3B, a curTime.getTimeInMillis( ) return value, which is the current data request time, and a preTime.getTimeInMillins( ) return value, which is the previous data request time, may be input to a timeDiff variable which is an interval of a data request time at which the streaming application requests data.

Syntax 303 regarding a conditional statement may determine whether to adjust the data provision time interval when transmitting data to the streaming application, using the timeDiff value which is the data request time interval calculated in the above syntax 302.

For example, the conditional statement may determine whether the timeDiff value, which is the data request time interval, is smaller than the constTime value, which is the data provision time interval, returned via the getDelay( ) function in FIG. 3A.

If the data request time interval is smaller than the data provision time interval, the conditional statement may call a delay function, Thread.sleep( ) in syntax 304, and input a specific time for delay of data as a parameter value of the Thread.sleep( ) function. In this case, the specific time may be a value obtained by calculating a difference between the constTime value, which is the data provision time interval returned by the getDelay( ) function, and the timeDiff value which is the data request time interval of the streaming application.

As such, by delaying data to be transmitted to the streaming application for a predetermined time in consideration of both the data provision time interval and the data request time interval, the streaming application receiving the data is allowed to determine a network state reliably.

Figure 4:
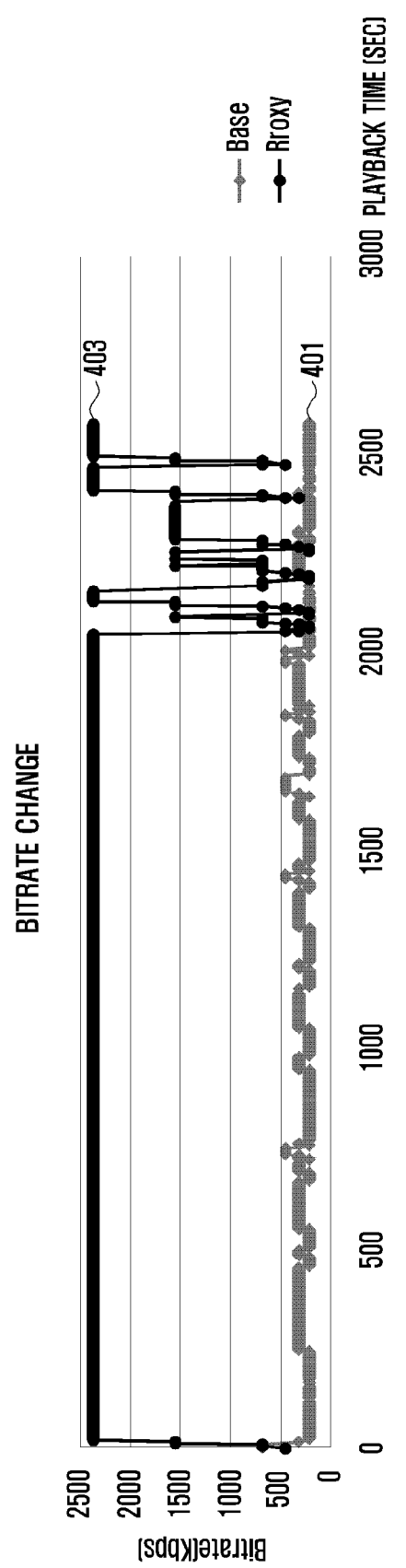
FIGS. 4 and 5 are diagrams showing effects in case of providing data to a streaming application according to an embodiment of the present disclosure.
Figure 5:

FIGS. 4 and 5 are diagrams showing effects in case of providing data to a streaming application in the adaptive streaming service according to an embodiment of the present disclosure.

In FIG. 4, the x-axis represents a playback time of streaming content, and the y-axis represents a bit rate of streaming content.

In FIG. 4, graphs 401 and 403 represent changes in data constituting the streaming content according to the playback time.

The graph 401 shows a change in data in a situation where the streaming application receives data from the streaming server according to a typical method. The graph 403 shows a change in data in a situation of providing data to the streaming application through the proxy module by applying the data providing method based on the adaptive delay according to embodiments of this disclosure.

Comparing the graph 401 and the graph 403, it can be seen that in case of the data providing method based on the adaptive delay according to embodiments of this disclosure, the resolution of streaming content is dramatically improved and continuously maintained.

In addition, FIG. 5 is a table showing the average resolution and the data request rate of the streaming application in each of a typical data providing method and the data providing method based on the adaptive delay of this disclosure.

In the table of FIG. 5, a column 501 indicates the average resolution of data and the data request rate when the streaming application provides data received from the streaming server according to the typical method. A column 503 indicates the average resolution of data and the data request rate when the streaming application receives data through the proxy module. A column 505 indicates the average resolution of data and the data request rate when providing data via the proxy module applying the adaptive delay according to embodiments of this disclosure.

Referring to the table of FIG. 5, compared to the typical method in the column 501, the method of providing data by applying the adaptive delay according to embodiments of this disclosure improves the average resolution by about 650% and reduces the data request rate by 25%. That is, it can be seen that, in the method according to embodiments of this disclosure, the streaming application requests data more stably and thus the resources of the electronic device are also efficiently used.

Figure 6:
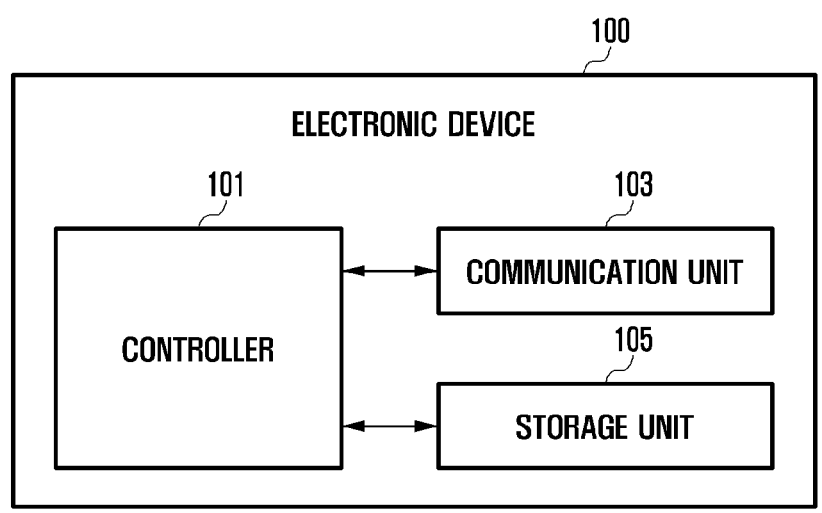
FIG. 6 is a block diagram illustrating a configuration of an electronic device for providing data to a streaming application according to an embodiment of the present disclosure.

FIG. 6 is a block diagram illustrating a configuration of an electronic device for providing data to a streaming application in the adaptive streaming service according to an embodiment of the present disclosure.

The terms "unit" or "module" used herein refer to an entity for processing at least one function or operation, and may be implemented by hardware, software, or a combination of hardware and software.

The electronic device 100 shown in FIG. 6 includes a controller 101, a communication unit 103, and a storage unit 105.

The communication unit 103 may download data constituting streaming content from an external device that provides the streaming content or relays transmission of the streaming content, and may store the downloaded data in the storage unit 105. The data received through the communication unit 103 may be stored in a buffer region of the storage unit 105. In addition, the communication unit 103 may receive various signals, messages, and data from other entities included in the streaming system under the control of the controller 101.

The communication unit 103 performs functions for receiving a signal through a wireless channel. The communication unit 103 may include a transceiver that transmits and receives a signal. For example, the communication unit 103 may perform reception of a radio frequency (RF) signal, frequency conversion, demodulation, decoding, cyclic prefix (CP) removal, fast Fourier transform (FFT), channel estimation, equalizing, and the like. The communication unit 103 may further perform a function of transmitting a signal processed by the controller 101 to other entity.

The communication unit 103 may include, for example, at least one of a cellular module, a WiFi module, a Bluetooth module, a GNSS module, an NFC module, and an RF module. The cellular module may provide, for example, a streaming service, a voice call, a video call, a messaging service, or an Internet service through a network. The cellular module may include a communication processor (CP). According to an embodiment, at least some (e.g., two or more) of the cellular module, the WiFi module, the Bluetooth module, the GNSS module, and the NFC module may be included in one integrated chip (IC) or IC package.

The storage unit 105 may store programs and various data related to the operation of providing data to the streaming application in the streaming service according to embodiments of this disclosure under the control of the controller 101. In addition, the storage unit 105 may store data constituting streaming content downloaded through the communication unit 103 in a buffer region. Also, the storage unit 105 may store various signals, messages, and data received from other entities by the communication unit 103.

The storage unit 103 (or memory) may include, for example, at least one of an internal memory and an external memory. The internal memory may include, for example, at least one of a volatile memory (e.g., DRAM, SRAM, or SDRAM) or a nonvolatile memory (e.g., one time programmable ROM (OTPROM), PROM, EPROM, EEPROM, mask ROM, flash ROM, flash memory, hard drive, or solid state drive (SSD)). The external memory may include, for example, at least one of a flash drive, a compact flash (CF), a secure digital (SD), a micro-SD, a mini-SD, an extreme digital (xD), a multi-media card (MMC), or a memory stick. The external memory may be functionally or physically connected to the electronic device 100 through various interfaces.

The controller 101 controls the overall operation of the electronic device 100 and, in particular, controls the data providing operation applying the adaptive delay according to embodiments of this disclosure. The controller 101 may receive signals, messages, and data through the communication unit 103. In addition, the controller 101 may write data to the storage unit 105 and read data from the storage unit 105. For this purpose, the controller 101 may include, or may be part of, at least one processor, a microprocessor, or a microcontroller.

According to an embodiment, the communication unit 103 may download first data, which is a fragment of streaming content, from an external device (e.g., a streaming server), and the storage unit 105 may store the downloaded first data. The controller 101 may determine a data provision time interval which is an interval of time at which each of a plurality of data constituting the streaming content is provided to a streaming application through a proxy module. In addition, when the streaming application requests the first data, the controller 101 may provide the stored first data to the streaming application through the proxy module, based on the determined data provision time interval.

In addition, when providing the first data to the streaming application, the controller 101 may provide the first data to the streaming application after delay for a predetermined time, based on the determined data provision time interval.

In addition, when providing the first data to the streaming application, the controller 101 may provide the stored first data to the streaming application, based on a data request time interval which is an interval between a request time for the first data and a request time for second data which is a fragment next to the first data in the streaming content.

In addition, when providing the first data to the streaming application, the controller 101 may compare the data provision time interval with the data request time interval and, based on a comparison result, provide the stored first data to the streaming application.

In addition, if the data request time interval is equal to or greater than the data provision time interval, the controller 101 may immediately provide the stored first data to the streaming application.

In addition, if the data request time interval is smaller than the data provision time interval, the controller 101 may delay the first data for a predetermined time and provide the delayed first data to the streaming application. In this case, the predetermined time may be a difference between the data provision time interval and the data request time interval.

In addition, the data provision time interval may decrease as a bit rate of data requested to the proxy module by the streaming application increases.

In addition, the data provision time interval may increase as a data providing rate at which the proxy module provides data to the streaming application increases.

In addition, the data provision time interval may decrease as a playback time of data provided to the streaming application by the proxy module increases.

Although FIG. 6 illustrates the electronic device 100 including the controller 101, the communication unit 103, and the storage unit 105, the electronic device 100 may further include any other element.

Figure 7:
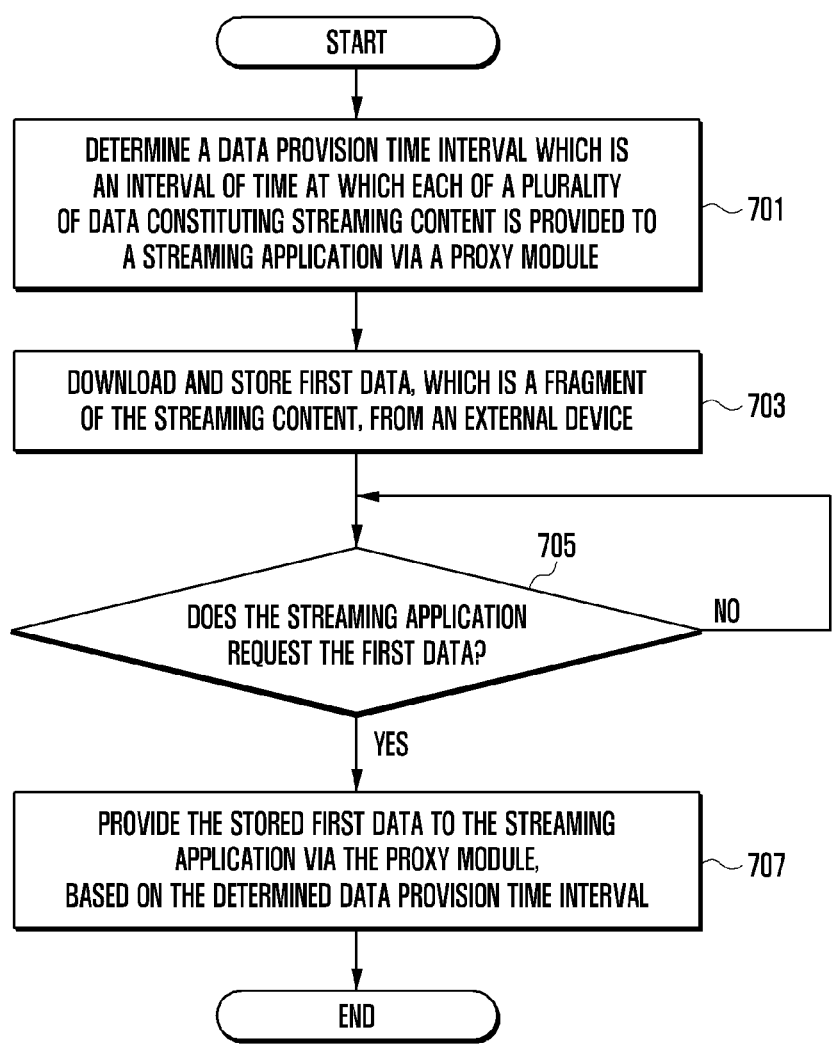
FIGS. 7 and 8 are flow diagrams illustrating a method for providing data to a streaming application according to embodiments of the present disclosure.

FIG. 7 is a flow diagram illustrating a method for providing data to a streaming application in the adaptive streaming service according to an embodiment of the present disclosure.

At operation 701, the electronic device 100 may determine a data provision time interval which is an interval of time at which each of a plurality of data constituting streaming content is provided to the streaming application 110 via the proxy module 120.

At operation 703, the electronic device 100 may download first data, which is a fragment of the streaming content, from the external device 150 and store the first data. Alternatively, the operation 703 may be performed in advance before the operation 701. That is, after downloading and storing the first data, the electronic device 100 may determine the data provision time interval.

At operation 705, the electronic device 100 may determine whether the streaming application 110 requests the first data. Alternatively, the operation 705 may be performed in advance before the operation 701. That is, after determining whether the streaming application 110 requests the first data, the electronic device 100 may determine the data provision time interval.

If it is determined that the streaming application 110 requests the first data, the electronic device 100 may provide the stored first data to the streaming application 110 via the proxy module 120 at operation 707, based on the determined data provision time interval. On the other hand, if the streaming application 110 does not request the first data, the electronic device 100 may continuously monitor whether the streaming application 110 requests the first data.

According to one embodiment, when the streaming application 110 requests the first data, the electronic device 100 may provide the first data to the streaming application 110 after delay for a predetermined time, based on the determined data provision time interval.

According to another embodiment, when the streaming application 110 requests the first data, the electronic device 100 may provide the stored first data to the streaming application 110, based on the determined data provision time interval and based on a data request time interval which is an interval between a request time for the first data and a request time for second data which is a fragment next to the first data in the streaming content.

Figure 8:
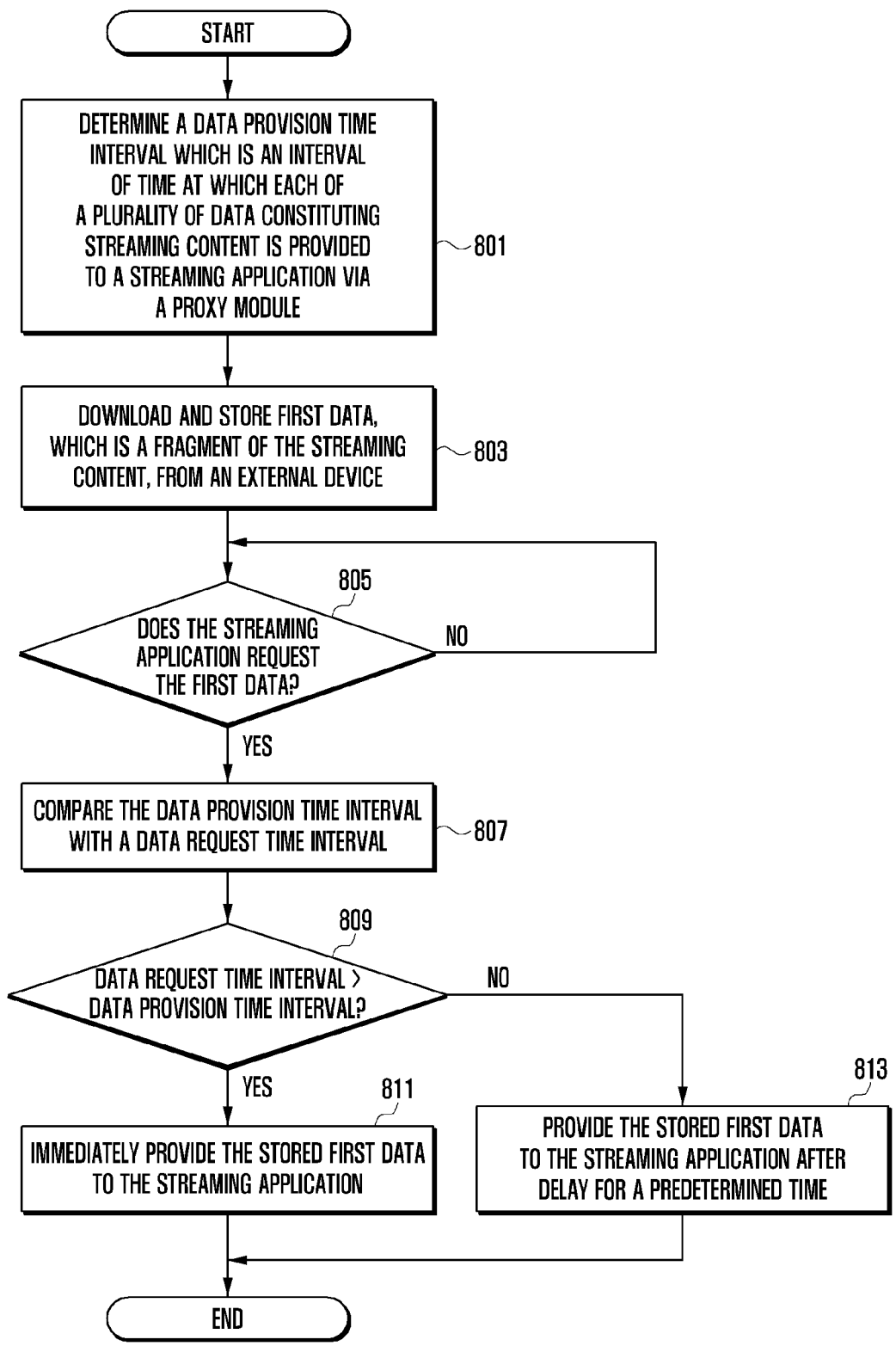

FIG. 8 is a flow diagram illustrating a method for providing data to a streaming application in the adaptive streaming service according to another embodiment of the present disclosure.

At operation 801, the electronic device 100 may determine a data provision time interval which is an interval of time at which each of a plurality of data constituting streaming content is provided to the streaming application 110 via the proxy module 120.

At operation 803, the electronic device 100 may download first data, which is a fragment of the streaming content, from the external device 150 and store the first data.

At operation 805, the electronic device 100 may determine whether the streaming application 110 requests the first data.

If it is determined that the streaming application 110 requests the first data, the electronic device 100 may compare the determined data provision time interval with a data request time interval at operation 807. In this case, the data request time interval may be an interval between a request time for the first data and a request time for second data which is a fragment next to the first data in the streaming content.

As a comparison result, the electronic device 100 may determine at operation 809 whether the data request time interval is equal to or greater than the data provision time interval.

If it is determined that the data request time interval is equal to or greater than the data provision time interval, the electronic device 100 may immediately provide the stored first data to the streaming application 110 at operation 811.

On the other hand, if the data request time interval is smaller than the data provision time interval, the electronic device 100 may provide the stored first data to the streaming application 110 after delay for a predetermined time at operation 813.

At least a portion of the apparatus (e.g., modules or functions thereof) or method (e.g., operations) according to embodiments of the present disclosure may be implemented as instructions stored in the form of a program module in non-transitory computer readable media. When the instructions are executed by the processor, the processor may perform functions corresponding to the instructions.

The program may be stored in a computer-readable non-transitory recording medium, and then read and executed by a computer, thereby implementing embodiments of the present disclosure.

The non-transitory recording medium refers to a specific medium that semi-permanently stores data and can be read by an apparatus, and may include a volatile or nonvolatile memory, such as a register, a cache, or a buffer, which temporarily stores data for calculation or transmission.

On the other hand, transitory transmission media such as signals and currents do not correspond to the non-transitory recording media.

Specifically, the above-mentioned program may be provided by being stored in a non-transitory readable recording medium such as CD, DVD, hard disk, Blu-ray disk, USB, internal memory, memory card, ROM or RAM.

In addition, the above-mentioned program may be registered in a server by a seller thereof, stored in a memory of the server, and transmitted to a terminal connected to the server via a network.

According to an embodiment, a computer-readable non-transitory recording medium may store a program that enables an electronic device to perform, in an adaptive streaming service, an operation of determining a data provision time interval which is an interval of time at which each of a plurality of data constituting streaming content is provided to a streaming application through a proxy module, an operation of downloading and storing first data, which is a fragment of the streaming content, from an external device, and an operation of, when the streaming application requests the first data, providing the stored first data to the streaming application through the proxy module, based on the determined data provision time interval.

While this disclosure contains many specific implementation details, these should not be construed as limitations on the scope of the disclosure or of what may be claimed, but rather as descriptions of features that may be specific to particular embodiments of particular disclosure.

INDUSTRIAL APPLICABILITY

The present invention can be used in a field of providing a streaming service.

The invention claimed is:

1. A method for providing an adaptive streaming service data to a streaming application in an electronic device, the method comprising operations of:

determining a data provision time interval which is an interval of time at which each of a plurality of data constituting streaming content is provided to the streaming application in the electronic device through a proxy module included in the electronic device;

downloading and storing first data, which is a fragment of the streaming content, from an external device to a buffer of the electronic device;

when the streaming application requests the first data, identifying, by the proxy module, a data request time interval for providing to the streaming application;

providing, by the proxy module, the stored first data to the streaming application through the proxy module, after delay for a predetermined time, if the data request time interval is shorter than the data provision time interval; and immediately providing, by the proxy module, the stored first data in the buffer to the streaming application, if the data request time interval is equal to or longer than the data provision time interval.

2. The method of claim 1, wherein the data provision time interval decreases as a bit rate of data requested to the proxy module by the streaming application increases.

3. The method of claim 1, wherein the data provision time interval increases as a data providing rate at which the proxy module provides data to the streaming application increases.

4. The method of claim 1, wherein the data provision time interval decreases as a playback time of data provided to the streaming application by the proxy module increases.

5. An electronic device for providing an adaptive streaming service data to a streaming application, the electronic device comprising:

a communication unit configured to download, from an external device, first data which is a fragment of streaming content;

a storage unit configured to store the downloaded first data to a buffer of the electronic device; and a controller configured to:

determine a data provision time interval which is an interval of time at which each of a plurality of data constituting streaming content is provided to a streaming application included in the electronic device through a proxy module included in the electronic device, when the streaming application requests the first data, identify, by the proxy module, a data request time interval for providing to the streaming application, provide, by the proxy module, the stored first data to the streaming application through the proxy module, after delay for a predetermined time, if the data request time interval is shorter than the data provision time interval, and immediately provide, by the proxy module, the stored first data in the buffer to the streaming application, if the data request time interval is equal to or longer than the data provision time interval.

6. The electronic device of claim 5, wherein the predetermined time is a difference between the data provision time interval and the data request time interval.

7. The electronic device of claim 5, wherein the data provision time interval decreases as a bit rate of data requested to the proxy module by the streaming application increases.

8. The electronic device of claim 5, wherein the data provision time interval increases as a data providing rate at which the proxy module provides data to the streaming application increases.

9. A computer-readable non-transitory recording medium storing a program that enables an electronic device to provide an adaptive streaming service data to a streaming application in the electronic device, operations of:
- determining a data provision time interval which is an interval of time at which each of a plurality of data constituting streaming content is provided to the streaming application in the electronic device through a proxy module included in the electronic device;
- downloading and storing first data, which is a fragment of the streaming content, from an external device to a buffer of the electronic device;
- when the streaming application requests the first data, identifying, by the proxy module, a data request time interval for providing to the streaming application;
- providing, by the proxy module, the stored first data to the streaming application through the proxy module, after delay for a predetermined time, if the data request time interval is shorter than the data provision time interval; and
- immediately providing, by the proxy module, the stored first data in the buffer to the streaming application, if the data request time interval is equal to or longer than the data provision time interval.

10. The method of claim 1, wherein providing the stored first data after the delay for a predetermined time comprises providing the stored first data to the streaming application after a delay corresponding to a difference between the determined data provision time interval and the data request time interval.

11. The method of claim 1, wherein the data provision time interval is determined as a Constant Delay according to $$\text{Constant Delay} = \alpha - \frac{\text{Bitrate} * \text{Duration}}{proxyBW} + marginalDelay,$$

wherein
- α is an interval of a request time at which the streaming application sends a request for data to the proxy module,
- proxyBW is a data provision rate when the proxy module provides data to the streaming application,
- Bitrate is a bit rate based on a transmission rate per time of data requested to the proxy module by the streaming application,
- Duration is a data playback time for which data provided to the streaming application by request is actually played, and
- marginalDelay is a time for data processing at the electronic device.

12. The electronic device of claim 5, wherein the data provision time interval is determined as a Constant Delay according to $$\text{Constant Delay} = \alpha - \frac{\text{Bitrate} * \text{Duration}}{proxyBW} + marginalDelay,$$

wherein
- α is an interval of a request time at which the streaming application sends a request for data to the proxy module,
- proxyBW is a data provision rate when the proxy module provides data to the streaming application,
- Bitrate is a bit rate based on a transmission rate per time of data requested to the proxy module by the streaming application,
- Duration is a data playback time for which data provided to the streaming application by request is actually played, and
- marginalDelay is a time for data processing at the electronic device.

* * * * *